(No Model.)
E. SOLVAY.
MANUFACTURE OF SODA BY THE AMMONIA PROCESS.
No. 263,981. Patented Sept. 5, 1882.
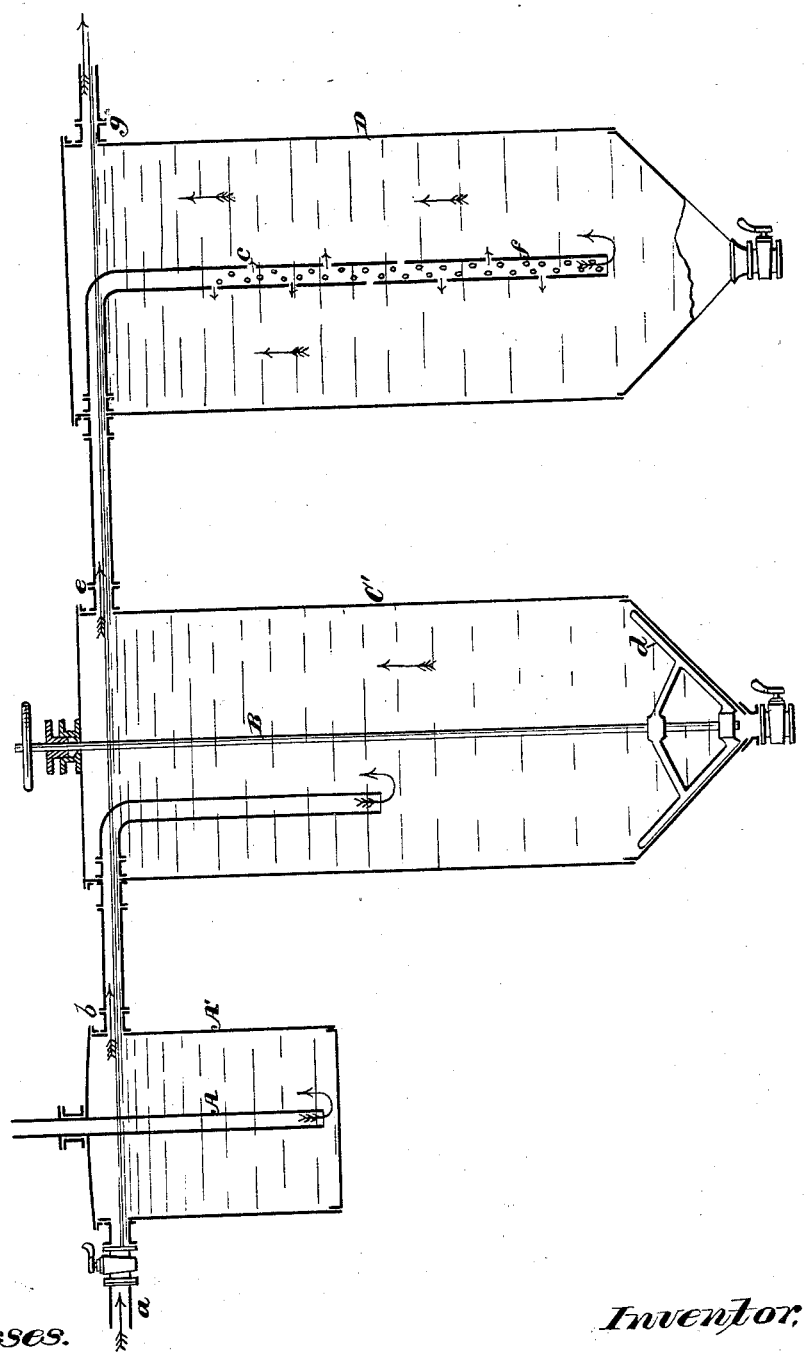
Witnesses.
Robert Everett
J. A. Rutherford
Inventor,
Ernest Solvay.
By James L. Norris
Atty.

UNITED STATES PATENT OFFICE.

ERNEST SOLVAY, OF BRUSSELS, BELGIUM.

MANUFACTURE OF SODA BY THE AMMONIA PROCESS.

SPECIFICATION forming part of Letters Patent No. 263,981, dated September 5, 1882.

Application filed June 22, 1882. (No model.) Patented in France May 7, 1879, No. 130,527; in Belgium May 7, 1879, No. 48,153; in England June 16, 1879, No. 2,387, and in Germany July 5, 1879, No. 8,180.

*To all whom it may concern:*

Be it known that I, ERNEST SOLVAY, of Brussels, Belgium, have invented new and useful Improvements in the Manufacture and Treatment of Soda, (for which I have obtained a patent in Great Britain, No. 2,387, bearing date the 16th of June, 1879,) of which the following is a specification.

My invention relates to the manufacture of soda by the process generally known as the "ammonia process," for which Letters Patent were granted to me in the United States, dated March 4, 1873, and which process, as further improved by me, is described in the specification of Letters Patent granted to me bearing date October 16, 1877, and December 25, 1877.

This invention relates to the manufacture of soda by the ammonia process; and it consists essentially in "dosing" the brine by causing a continuous supply of both brine and ammonia to a saturating-vessel, from which the overflow is conducted to a vessel or series of vessels, in which precipitation of the sludge takes place before carbonating and during the continuous flow of the ammoniacal brine.

In the manufacture of soda by the ammonia process it has been my constant aim to obtain a continuous and regular absorption of the ammonia in the brine, so as to provide for the decomposing process a liquid always fulfilling the necessary conditions. At first I used the process of dosing the ammonia based upon the specific gravity of the liquid, and subsequently, when carbonic acid was found mixed with the ammonia from the distillation process and the difference in the density of the materials used could no longer be considered as affording a certain basis, I regulated the dosing according to the increase of volume produced by the absorption of the ammonia. Since then I have observed that these operations were mostly required because the liquid merely passed through the absorbing apparatus without remaining in them, so that there could be no compensation between the quantities of brine differently charged with ammonia at different times. This led me to discover that if the vessels used for the purpose were sufficiently large the said compensation would be easily effected, thus constituting a new self-acting process of dosing, it being only necessary to regulate the exact quantity of brine or of ammonia required to give the proper mixture at long intervals, when it would be easy to increase or diminish the proportions according as the mixture contained a too great or too small average quantity of one or the other.

It will be readily understood that in the regular course of manufacture, as the quantity of ammonia evolved is pretty nearly the same one day as another, all that is necessary is to regulate the inflow of natural brine to the absorbing process, so that, notwithstanding the variations in the quantity of ammonia arriving at every moment, after a few hours pretty nearly the same quantity of liquid will be produced. The use of these large reservoirs of liquid has led to a further improvement. Up to this time the decantation of the sludge (consisting generally of carbonate of lime and of magnesia) from the purification of impure brine, either natural brine or other brine, has been effected alternately in several reservoirs working intermittently, and which were isolated for the decantation and then set to work again. The reason why a certain number of apparatus had to be used was that the liquid to be treated was a passing liquid in which a solid compound was formed, and that to enable the solid compound to fall to the bottom the liquid which had been treated must be separated from what had not yet been treated. But when a sufficiently large apparatus is used the great mass of liquid within it is but little affected by the troubled liquid, which is caused to enter at a suitable part of the apparatus, and, in its passage through the apparatus to the other end of it, deposits the precipitate it contains. By this means the same result is obtained as if several apparatus were used.

Since it has been necessary to perform the operation of decanting the sludge in the process of absorption of the ammonia, the points above described have acquired great importance, and I have thus been able to greatly improve my process by simplifying that part of the manufacture which consists in the preparation and purification of the ammoniacal brine.

This improvement consists in performing these operations upon such large masses of liquid that the temporary differences in the absorption of the ammonia compensate each other, and that the decantation of the sludge is effected without disturbing the other parts of the liquid. I adopt the following arrangement:

In the drawing, which shows in section an apparatus for carrying on the herein-described process, A indicates a vertical pipe passing down through the top of a reservoir, A', nearly to the bottom thereof. This reservoir connects near its top with the inlet-pipe a, having a suitable cock, and the overflow-pipe b, which passes into a second larger reservoir, C', near the top of the latter and extends about half-way down in the same. A rotary agitator, d, is located in the bottom of this larger reservoir, and is mounted upon a rotary vertical shaft, B, which extends up through the top of the reservoir and is driven in any suitable way. This second reservoir, C', connects by any overflow-pipe, e, with a third large reservoir, D, also having an overflow-pipe, g. The pipe e passes down into the reservoir D to a point near the bottom of the latter, and for a portion of its length within the said reservoir it is perforated, as shown. The two second large reservoirs are also provided at their bottoms with suitable valves or cocks, c.

The ammonia given off by the process of distillation is conducted by a pipe, A, into the absorbing-reservoir A', into which natural brine is caused to flow through a suitable regulating cock or valve in a pipe, a. The overflow situated near the top of the said absorbing-reservoir allows the ammoniacal liquid, with any sludge it may contain in suspension, to flow out of the said reservoir into the second very large reservoir, C', used for the decantation. The liquid in the said second reservoir not being agitated by the introduction of ammonia, as in the first reservoir, the sludge and impurities it contains in suspension fall continuously to the bottom, from which they are removed from time to time through a suitable cock or valve in pipe c, the pressure of the liquid above the said cocks or valves forcing out the said sludge and impurities to any required place; and I prefer that they should be conducted to the distilling apparatus, so as to collect the ammonia they contain. The agitator d, which has a slow and continuous or intermittent motion, may be used to prevent the sludge from hardening. From the said second reservoir the ammoniacal brine which has been clarified passes out through the overflow at the top of the said reservoir into a third reservoir, similar in construction or size to the second reservoir. The said third reservoir, being constantly kept full in consequence of the mass of liquid it contains, will act to regulate the dosing of the ammonia. The ammoniacal brine is caused to enter the said third reservoir through a vertical inner pipe, perforated with holes, and of the same height as the reservoir, or through several outside pipes opening into the reservoir at different points in its height, so as to cause the said brine to mix at once and constantly with the whole mass of liquid in the said reservoir. At about the top of the said reservoir is the overflow-pipe, through which the ammoniacal brine, which must thus necessarily represent an average dosing of the ammonia, flows freely, and is conveyed away, to be submitted to the decomposing process by which the magnesium salts are precipitated.

It will be readily understood that by the arrangements hereinbefore described the process is continuous and the dosing of the ammonia is regular, the large mass treated gives an average quality of the required strength, and the admission of natural brine into the absorber may be regulated according to the amount of ammonia contained in the liquid in the said third reservoir, which liquid represents the average strength, and will vary but slightly, owing to the mass of liquid treated, which corrects any momentary irregularity in the quantity of ammonia introduced. The volume of the liquid treated in the said reservoirs should be about equivalent to what is to be treated, say, in twelve hours.

I effect the purification of brine as follows: In the specification of Letters Patent granted to me and bearing date December 25, 1877, I described a process for precipitating the lime and magnesia generally contained in brine in the form of soluble salts during the course of the manufacture of soda. The said process, though satisfactory in practice, still often leaves a small quantity of magnesia in solution in the ammoniacal brine. Now, this part of my invention consists in means of removing all or nearly all the magnesia contained in the said brine by adding thereto a quantity of carbonate of soda without interfering with the operations being carried on. For this purpose I dissolve carbonate of soda in pure water, or by preference in brine, either ammoniacal brine or other brine, and I introduce the solution into the brine immediately after the absorption of the ammonia. Nearly all the magnesia in solution is then precipitated in the form of carbonate of magnesia. It is advantageous to use in this case a quantity of carbonate of soda much greater than its equivalent of magnesia in solution, and this is not a disadvantage, as the said soda is returned later on in the manufacture. Instead of carbonate of soda, carbonate of potash or soluble phosphates, or a mixture of these salts, may be employed for the purpose.

I claim as my invention of improvements in the manufacture and treatment of soda—

In the manufacture of soda by the ammonia process, dosing the brine by causing a continuous supply of both brine and ammonia to the saturating-vessel, from which the overflow is conducted to a vessel or series of vessels, in which precipitation of the sludge takes place before carbonating and during the continuous flow of the ammoniacal brine, substantially as described.

ERNEST SOLVAY.

Witnesses:
R. S. KIRKPATRICK,
H. T. E. KIRKPATRICK.